Patented Apr. 2, 1946

2,397,774

UNITED STATES PATENT OFFICE 2,397,774

ADHESIVE TAPE

Donald J. Buckley, Baton Rouge, La., assignor to Industrial Tape Corporation, North Brunswick Township, N. J., a corporation of New Jersey No Drawing. Application December 4, 1942, Serial No. 467,903

3 Claims. (Cl. 117—122)

This invention relates to adhesive sheets or tapes of a character having a normally pressure sensitive adhesive mass and to a method of making the same.

Pressure sensitive adhesive sheets or tapes have generally been manufactured with adhesive masses containing crude or unvulcanized rubber together with a resinous material for imparting a tacky condition to the mass. Such tapes have found many applications, especially as a masking means in painting operations where contiguous colors require clear lines of demarkation. However, in these painting operations involving baking or high temperature drying, the adhesive masses containing unvulcanized or raw rubber do not function as well as desired because of the rapid deterioration or aging of the crude rubber and its tendency to soften and liquify under the influence of heat.

Vulcanized rubber has aging characteristics superior to raw rubber and is able to withstand high temperatures far better without deterioration. While perhaps better than crude rubber when used in the adhesive mass of a pressure sensitive tape for high temperature service, vulcanized rubber nevertheless is not the complete answer to the problem. It can satisfactorily withstand the heat without deterioration to any substantial extent and presents no problem insofar as adhesion is concerned. However, when such tapes are removed from the work after being subjected to the high temperatures of a baking operation, there is a tendency for the adhesive to become off-set, i. e., a portion of the adhesive remains on or is transferred to the work surface, thus presenting a problem in removal.

It is believed that this off-setting of the adhesive mass arises from the fact that the tape becomes more firmly bonded to the work surface than otherwise normally would be the case in the absence of heat, with the result that the adhesive ruptures rather than the bond when the tape is removed. In other words, there is a sealing effect due to the heat which greatly promotes the adhesion between the pressure sensitive mass and the surface to which the tape is applied, this adhesive effect usually becoming greater than the cohesion inter se of the mass.

According to the instant invention, the off-setting of the adhesive mass is eliminated by providing in the pressure sensitive mass a rubber or rubbery material which is partially vulcanized, together with an agent that will effect the vulcanization of such rubber or rubbery material when the tape subsequently is subjected to heat in service. As manufactured, the tape does have a normally pressure sensitive adhesive so that it can readily be applied to the work, but while the tape is in use the heat to which it is subjected acts to vulcanize the previously unvulcanized rubber in the mass, thus augmenting the cohesion of the mass to a point where it exceeds the adhesion between the mass and the work surface resulting from the heat sealing effect previously alluded to.

While the mass could be prepared from a suitable mixture of raw or unvulcanized rubber or reclaimed rubber, a tackifying resin and the necessary vulcanizing agents, together with the accelerator of choice and calendered on to the backing sheet, it is preferred that the mass be partially vulcanized during its manufacture in order that the optimum conditions will obtain for initially applying the tape to the work. This procedure is greatly facilitated when the adhesive mass is knife spread upon the tape backing. For knife spreading, the ingredients comprising the mass are dispersed in a suitable solvent and the solution spread on the backing member. The solvent is then evaporated by passing the tape through a suitable oven maintained at proper temperature conditions.

By suitably proportioning the amounts of rubbery material, tackifying resin, vulcanizing agents and accelerator, there can be obtained a close control of the extent of prevulcanization, i. e., the vulcanization that occurs prior to the completion of the tape, and of the extent to which there are left in the mass vulcanizable ingredients for subsequent vulcanization when the tape is in service. This procedure not only enables the optimum conditions of tackiness to be secured for the initial application of the tape to the work but also suffices to control the degree of cohesiveness that subsequently will be developed when the tape is in service.

An example of a suitable mass for practicing the invention is as follows:

| | Per cent |
|---|---|
| Rubber | 50 to 75 |
| Sulphur | 0.5 to 2 |
| Resin | 5 to 10 |
| Calcium carbonate | 20 to 40 |
| Zinc oxide | 2 to 6 |
| Butyl "8" | 0.5 to 3 |

It will be understood, of course, that the above example is not given by way of limitation and that any mixture of materials capable of securing the advantages of the invention may be used.

While pale crepe, smoked sheet, or Para rubber is preferred, reclaimed rubber might also be used, in which case the quantity and type of vulcanizing agents added would depend upon the extent to which the reclaimed rubber had been previously vulcanized and subsequently broken down. Cumar resins, or mixtures thereof or their equivalents, may be used to supply the necessary tack. Information concerning this type resin may be found in "The Condensed Chemical Dictionary," Third edition, published by the Reinhold Publishing Corporation. As therein stated, the cumars, otherwise known as "coumarone-indene resins," are neutral resins and may be used with either plantation or synthetic rubbers. A softening agent such as lanolin or pine tar may or may not be used, as desired. The calcium carbonate serves as a filler, while the zinc oxide serves its usual function in promoting vulcanization. The purposes of the sulphur and of the accelerator are well known.

One method, not previously mentioned, of accurately controlling the degree of vulcanization that takes place during manufacture and the degree of vulcanization that ultimately occurs when the tape is in use, is to use accelerators of different types, one operable at the temperature encountered in the solvent drying oven, and another operable at the temperatures encountered in the field. For example, temperatures that have been used in the solvent evaporating oven range from 170° to 190° F., and tapes have been made for service in a temperature range of 250° to 350° F. The spread between these ranges is sufficient to permit the use of accelerators operable selectively in the different ranges.

Cloth with or without a barrier coat may be employed as a backing sheet, as may also paper provided it has sufficient strength. Paper impregnated with raw rubber which is subsequently cured, or paper impregnated with reclaimed rubber is suggested and excellent tapes have been made in accordance with the invention with papers thus treated.

From the foregoing it will be apparent that what promised to be a serious obstacle in the use of pressure sensitive adhesive tapes under high temperature conditions has been overcome by the improved tape made in accordance with this invention. The adhesive mass formulations and the backing materials have been set forth merely by way of example and without intending to limit the invention which encompasses many modifications within its scope. It is to be understood, therefore, that the invention is to be limited only by the prior art and by the scope of the appended claims.

Having thus described the invention, what I claim is:

1. A normally usable and removable pressure-sensitive adhesive masking sheet adapted for service under high temperature conditions and which includes a backing and a pressure-sensitive adhesive coating firmly united thereto, said adhesive coating in the sheet as manufactured for service having such tackiness at normal temperatures as readily to adhere to a surface by application of normal pressure and comprising a vulcanizable rubber, a coumarone-indene type tackifying resin and a vulcanizing agent operable in the presence of the other ingredients of the adhesive coating and at the relatively high temperatures to which the sheet is subjected in service to cure the vulcanizable ingredient and increase the cohesiveness inter se of the adhesive coating whereby the sheet after use under high temperature conditions is removable from the surface to which it is applied without substantial offsetting of the adhesive coating.

2. A normally usable and removable pressure-sensitive adhesive masking sheet adapted for service under high temperature conditions and which includes a backing and a pressure-sensitive adhesive coating firmly united thereto, said adhesive coating in the sheet as manufactured for service having such tackiness at normal temperatures as readily to adhere to a surface by application of normal pressure and comprising a partially vulcanized rubber, a coumarone, an indene type tackifying resin and a vulcanizing agent operable in the presence of the other ingredients of the adhesive coating and at the relatively high temperatures to which the sheet is subjected in service, further to cure the already partially vulcanized ingredient and increase the cohesiveness inter se of the adhesive coating whereby the sheet after use under high temperature conditions is removable from the surface to which it is applied without substantial offsetting of the adhesive coating.

3. A normally usable and removable pressure-sensitive adhesive masking sheet adapted for service under high temperature conditions and which includes a backing and a pressure-sensitive adhesive coating firmly united thereto, said adhesive coating in the sheet as manufactured for service having such tackiness at normal temperatures as readily to adhere to a surface by application of normal pressure and comprising a partially vulcanized rubber, a coumarone-indene type tackifying resin and unreacted sulphur, said sulphur being operable in the presence of the other ingredients of the adhesive coating and at the relatively high temperatures to which the sheet is subjected in service further to cure the already partially vulcanized ingredient and increase the cohesiveness inter se of the adhesive coating whereby the sheet after use under high temperature conditions is removable from the surface to which it is applied without substantial offsetting of the adhesive coating.

DONALD J. BUCKLEY.